United States Patent
Duffy

[15] 3,675,958
[45] July 11, 1972

[54] SHEET METAL PANEL FASTENER

[72] Inventor: William B. Duffy, Berkeley Heights, N.J.

[73] Assignee: TRW Inc., Cleveland, Ohio

[22] Filed: June 17, 1970

[21] Appl. No.: 46,940

[52] U.S. Cl. ..........................287/189.36 D, 24/73 B, 85/36
[51] Int. Cl. ....................................F16b 17/00, F16b 37/02
[58] Field of Search.................85/36, 7, 8.8; 24/73 B, 73 SC; 287/189.36 F, 189.36 D

[56] References Cited

UNITED STATES PATENTS

| | | | |
|---|---|---|---|
| 2,566,886 | 9/1951 | Hartman | 24/73 B |
| 3,444,774 | 5/1969 | Duffy | 85/36 |
| 2,047,298 | 7/1936 | Tinnerman | 85/36 |
| R22,659 | 8/1945 | Tinnerman | 85/36 |
| 3,433,121 | 3/1969 | Vondran | 85/36 |
| 2,913,951 | 11/1959 | Van Buren | 85/36 |

*Primary Examiner*—Ramon S. Britts
*Attorney*—Philip E. Parker, James R. O'Connor, Hall & Houghton and Gordon Needleman

[57] ABSTRACT

A unitary, spring metal fastener has inner and outer arms connected by a resilient, reversely bent bight. Both of the arms have through openings formed therein. The arms are normally disposed in divergent untensioned relationship to each other. The outer arm includes two sections connected by resilient webs having an inverted U-shaped configuration. The opening in the outer arm is at least partially defined by a pair of stud gripping tongues struck upwardly from the adjacent ends of the arm sections substantially between the connecting webs. The fastener is particularly adapted for clamping an apertured member to a support having a stud projecting from the surface thereof confronting the member and through the aperture in the member by compressing the arms toward a substantially parallel relationship with each other to bring the openings therein into registering alignment and forcing the arms downwardly over the stud so that the aforementioned tongues grippingly engage the stud and, upon removal of the compressing force, exert an axial pull on the stud thereby tensioning the apertured member against the support. The fastener also includes means which are easily operable to release the tongues from gripping engagement with the stud for removal of the fastener.

8 Claims, 5 Drawing Figures

PATENTED JUL 11 1972    3,675,958

INVENTOR
WILLIAM B. DUFFY
BY
James R. O'Connor
ATTORNEY

SHEET METAL PANEL FASTENER

BACKGROUND OF THE INVENTION

1. Field of the Invention

The invention relates to releasable, sheet metal panel fasteners.

2. Description of the Prior Art

While it is envisioned that the present invention might be effectively utilized in any number of applications wherein the user desires to secure an apertured member to a supporting structure having a stud projecting from the surface thereof against which the apertured member is mounted, the principal motivating force behind the development of the invention was to provide an improved fastener for securing a loud speaker to a supporting cabinet or chassis. Consequently, the invention's contribution to the fastening art will be hereinafter discussed with particular reference to speaker mounting.

A review of earlier speaker mounting methods reveals that for many years nuts and bolts were almost universally employed by manufacturers of televisions, radios, phonographs, etc., for mounting speakers on the chassis of their respective models. Recently, an attempt was made to eliminate the use of nuts and bolts and replace same with spring clip fasteners which could be utilized with either threaded or nonthreaded studs projecting from a chassis frame. The best known of the newer speaker clip fasteners is disclosed in U.S. Pat. No. 3,433,121 issued to D. J. Vondran on Mar. 18, 1969. The Vondran specification contains a detailed discussion of the advantages to be realized from the use of spring clips and studs in lieu of nuts and bolts and, since the reader may have reference to that specification for a clearer understanding of the earlier encountered problems with nut and bolt mountings, it would be somewhat redundant to restate those problems here. However, while the Vondran invention would be attractive to manufacturers by reason of the speed with which his spring clamps may be applied to a stud, the lessening of potential damage to a speaker baffle and/or buffering gasket which the patentee correctly points out was a frequent occurrence when nuts were overtorqued on mounting bolts by power drivers, and the ease with which his clip can be removed from a stud and later reused, it is also quite obvious from a consideration of the patent specification that the above recited advantages were achieved by making substantial sacrifices with respect to the clamping force which the patentee's fastener maintains on the loud speaker rim and its supporting chassis or baffle. Moreover, the Vondran spring clip is subject to canting or tipping with respect to the engaged stud both during attachment and subsequent thereto, thereby substantially increasing the likelihood of the speaker shifting or wobbling when the unit on which it is mounted is jarred or subject to vibration, for example, when in transit.

Thus, the objective of the present invention is to provide an improved fastener which can be rapidly applied to a cooperating stud and readily removed from the stud and later reused if one so desires, which fastener exerts a substantially axial pull or tension on a stud and thereby imparts an optimum clamping force against a speaker rim to positively fix the rim against the supporting chassis. Since the clamping force is distributed over a relatively large surface area as compared with the usual nut and bolt fastening, the possibility of damage to the speaker rim and underlying gasket or the supporting chassis or baffle is negligible. Further the inverted U-shaped webs which connect the gripper tongue carrying sections of the outer arm of the present fastener are disposed adjacent opposite sides of the stud in an installation and provide a brace which inhibits canting or rocking of the fastener with respect to the stud and thereby substantially reduces the possibility of the speaker shifting or wobbling with respect to the studs and supporting chassis. Optionally, the inner arm of the improved fastener may carry a plurality of integral barbs which bitingly engage the speaker rim to provide an additional safeguard against accidental speaker shifting.

Additional improvements in which the invention's contribution to the art resides will become evident from a consideration of the detailed description of the preferred embodiment of the invention which follows hereinafter.

SUMMARY OF THE INVENTION

A fastener which is particularly adapted for clamping a first apertured member to a second member having a stud projecting from its surface confronting the first member and through the aperture in the first member. The fastener is of spring metal construction and has inner and outer arms which are normally oriented at an acute angle to each other and are connected at one end by a resilient, reversely bent bight. Each of the arms has a stud receiving opening, which openings are not normally in registered alignment. The outer arm has two sections connected by resilient outboard webs which have a generally inverted U-shaped configuration. The inboard opposed ends of the outer arm sections carry stud gripping tongues which are struck upwardly therefrom in the general direction of the connecting webs and are generally in the form of segments of a frustum of a cone. The stud gripping tongues partially define the stud receiving opening in the outer arm. The fastener is compressible about the bight and against the bias of the bight to move the arms toward a parallel relationship and bring the stud receiving openings into registration. Thus both fastener arms may be passed over the stud and forced downwardly to move the inner arm downwardly proximate the adjacent surface of the apertured member, and when the compressive force is removed the outer arm springs away from the inner arm under the bias of the bight which causes the tongues to bitingly engage the stud and exert an axial pull thereon and thereby tension the first apertured member against the second member. The fastener also embodies means operable to easily release the gripping engagement of the tongues on the stud to remove the fastener therefrom without damaging either the fastener or the stud. Ergo, the fastener is adapted for repeated removal and reuse if necessary.

DESCRIPTION OF A PREFERRED EMBODIMENT

Figure 2:
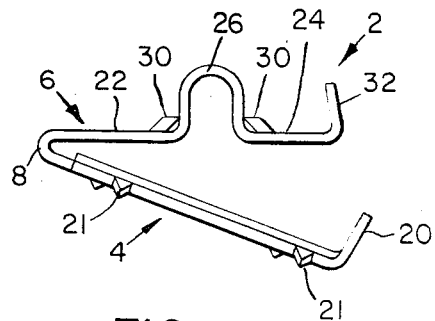

The fastener 2 is formed of spring sheet metal and includes an inner arm 4 and an outer arm 6 which are joined at one end thereof by a reversely bent, resilient bight 8. As best seen in FIG. 2, the arms 4 and 6 are normally disposed in divergent untensioned relationship to each other with the bight 8 defining an internal acute angle.

Figure 1:
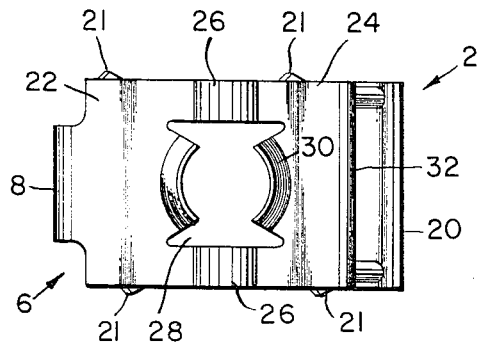
FIGS. 1, 2 and 3 are top plan, side elevational, and bottom plan views, respectively, of a preferred embodiment of the fastener according to the invention.
Figure 3:
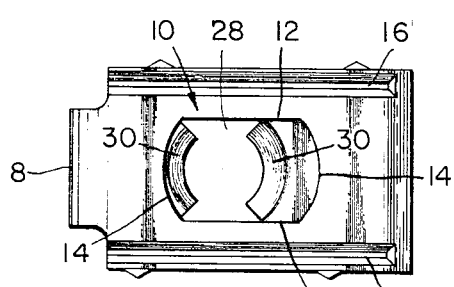

The inner arm 4, which is longer than the outer arm 6, has an elongated opening 10 formed therein. The opening 10 has a generally oblong configuration defined by parallel sides 12 and arcuate ends 14. A pair of longitudinal grooves 16 are impressed in the underside of the arm between its outboard side edges and the parallel sides 12 of the opening 10 to provide stiffening ribs 18 at the upper surface of the arm. The end of the arm remote from the bight 8 carries an upwardly bent finger 20 which is disposed generally perpendicular to the plane of the arm. A plurality of barblike projections 21 may be integrally joined to the inner arm and extend outwardly and downwardly from the outboard side edges thereof. As seen in FIGS. 1 and 3 each side edge carries a pair of projections and the projections on opposite sides are transversely offset from each other.

The outer arm 6 is formed in two sections 22,24, respectively, which sections are connected by resilient, outboard webs 26 which have a generally inverted U-shaped configuration. An opening 28 in the outer arm is at least partially defined by the opposed edges of a pair of tongues 30 which are struck upwardly from the inboard ends of the sections 22,24. As best depicted in FIGS. 1 and 2 the tongues 30 are in the form of segments of a frustum of a cone. Arm section 24 has a finger 32 bent upwardly from its end remote from the bight 8 which finger lies generally perpendicular to the plane of the said arm section.

As best seen in FIGS. 2 and 3 the centers of the opening 10 in arm 4 and the opening 28 in arm 6 are normally in nonregistering alignment.

Figure 4:
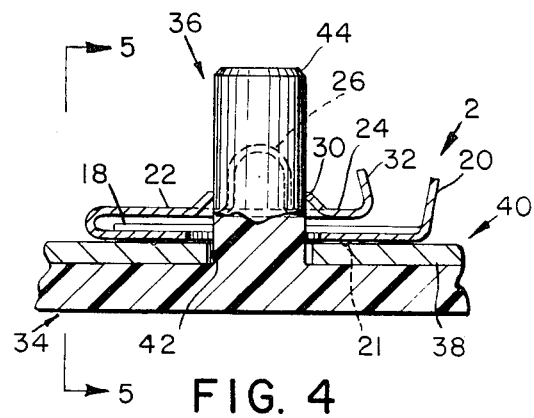
FIG. 4 is a view of a typical installation depicting the fastener securing an apertured member to a stud carrying support. The apertured member and support are shown in fragmentary cross section. The fastener is shown in cross section with one of its outer arm connecting webs depicted in phantom and the stud is depicted partially in section and partially in full.
Figure 5:
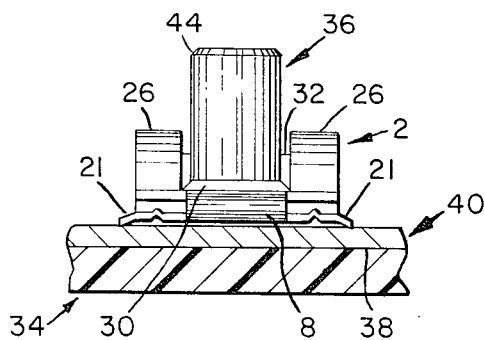
FIG. 5 is a section taken on line 5—5 of FIG. 4.

In the typical installation depicted in FIGS. 4 and 5, support 34 represents a section of a molded synthetic plastic radio cabinet or chassis which has a plurality of integral generally circular studs 36 projecting from the surface 38 thereof in a predetermined, spaced pattern. Mounted member 40 represents a section of the rim of a sheet metal loud speaker frame which has a plurality of spaced generally circular openings 42 cut therein in a pattern predetermined for ease of alignment of the openings with the studs projecting from the support cabinet or chassis. The diameter of the openings 42 is slightly larger than the diameter of the studs 36 to allow for minor variations in the location of the openings and the studs.

The attachment of the speaker rim 40 to the support chassis 34 is effected by holding the rim flush against the surface 38 of the chassis (in certain assemblies a buffering gasket may be interposed between the speaker rim and chassis) with the studs 36 projecting through the openings 42, and thereafter applying the fastener 2 to the studs.

As an individual fastener is pushed onto a stud, the upper or leading end of the stud, which may be chamfered or tapered as at 44, first passes through the opening 10 in the inner arm 4 (preferably toward the right end 14 of the said opening as viewed in FIG. 3) so that the leading end of the stud will pass at least partially into the opening 28 in the outer arm 6 and engage the undersurfaces of the tongues 30 particularly the tongue on the arm section 24. Pressure, preferably from a conveniently designed hand tool, is then applied simultaneously to both sections of the upper arm 6 to force the said arm downwardly, against the bias of the bight 8, toward a substantially parallel relationship with the arm 4 whereby the centers of openings 10 and 28 are brought into substantially registering alignment. The fastener may then be pushed downwardly over the stud until the inner arm is moved downwardly as closely proximate the confronting surface of the rim 40 as desired, at which point the pressure is removed.

Ideally, the outside diameter of the stud 36 is greater than the diameter of the portion of the opening 28 defined by the opposed semicircular edges of the tongues 30. Thus as the arm 6 is pushed down onto the stud, the arm sections 22,24 are laterally expanded against the bias of the connecting webs 26. This capacity of the arm sections to expand laterally greatly reduces the tendency of the opposed edges of the tongues to strip the plastic material at the peripheral surfaces of the stud as the arm moves down over the stud, and the spring tension the webs exert on the arm sections when the fastener is fully bottomed on the stud pulls the tongues laterally into effective gripping engagement with the stud. When the fastener applying pressure is removed, the outer arm 6 is urged away from the inner arm under the bias of the bight 8 whereby the tongues are forced upwardly away from the inner arm and exert an axial pull on the stud to securely tension the rim 40 against the support chassis 34. As best seen in FIG. 5, the connecting webs 26, which are in tension, are disposed closely adjacent the peripheral surface of the stud on opposite sides thereof to inhibit any appreciable canting or tipping of the fastener. The reader will also appreciate that the inner arm 4 overlies a relatively large surface area of the rim 40 to effect improved distribution of the clamping force on the mounted member and the supporting chassis or cabinet. The reader will also observe that the optional barblike projections 21 dig into the rim 40 to further inhibit shifting of the fastener with respect to the rim or the stud.

Should one desire to adjust the positioning of the speaker rim represented by the mounted member 40 or remove the speaker from the supporting chassis for repair or replacement, one simply grasps the upwardly bent fingers 20,32 with pliers and squeezes the fingers together to draw the outer arm section 24 further laterally away from arm section 22, against the bias of the connecting webs 26, to thereby release the grip of the tongues 30 on the stud. With the fingers 20,32 thus squeezed together, the fastener may be readily lifted from the stud. Since the removal is accomplished without permanent distortion of any of the fastener elements and with negligible stripping or scoring of the stud, the same fastener may be repeatedly used in connection with the same stud or other studs in a mounting assembly.

One will, of course, recognize that the foregoing detailed description of a preferred embodiment of the invention is to be construed in an illustrative rather than a limiting sense. It is definitely contemplated that changes and modifications in the disclosed fastener might be effected without departing from the spirit of the invention. It is also contemplated that the fastener might be efficiently utilized in engaging studs of other than molded plastic construction, for example, metal studs, nails, wire pins or the like fasteners which might project outwardly from a chassis formed from cast metal, wood or a wood substitute such as chip board. Therefore, for a clear definition of the scope of the invention one should have reference to the claims that follow.

What is claimed is:

1. A fastener for releasably clamping together a first apertured member and a second member having a stud projecting from the surface thereof confronting the first member and through the aperture in the first member, said fastener being formed of springy material and having inner and outer arms normally disposed in divergent untensioned relation to each other, each of said arms having a stud receiving opening, said stud receiving openings being normally in nonregistering alignment, said outer arm including at least two sections connected by a resilient web having a generally inverted U-shaped configuration and extending outwardly of said outer arm in a direction away from said inner arm, the inboard opposed ends of said sections embodying stud gripping means disposed substantially adjacent said connecting web, said stud gripping means extending outwardly from said arm sections in the general direction of said connecting web and said means at least partially defining the stud receiving opening in said outer arm, said fastener being compressible for movement of said arms toward a substantially parallel relationship to bring the said stud receiving openings into registering alignment whereby both arms of said fastener may be passed over the stud and then released to permit said outer arm to spring away from said inner arm thereby causing said stud gripping means to engage said stud and exert an axial pull thereon and thereby tension said first apertured member against said second member, said fastener embodying means operable to disengage said stud gripping means from said stud to permit removal of said fastener from said stud, said penultimate mentioned means being compressible against the bias of said resilient connecting web in a direction which is generally normal to the axis of the engaged stud.

2. A fastener according to claim 1 wherein said outer arm sections are connected by a pair of spaced resilient webs having a generally inverted U-shaped configuration and said stud gripping means are disposed substantially between said connecting webs.

3. A fastener according to claim 2 wherein said arms are joined at one end thereof by a reversely bent, resilient bight, the length of said outer arm is less than the length of said inner arm, and said means operable to disengage the said stud gripping means includes an upwardly bent finger at the terminal end of each arm opposite said bight, said fingers being disposed in spaced, generally parallel relationship to each other when said arms are compressed over a stud whereby said fingers may be grasped and squeezed together against the bias of said connecting webs to further separate the said sections of said upper arm and release said stud gripping means.

4. A fastener according to claim 1 wherein said stud gripping means includes at least a pair of opposed tongues struck from the internal ends of said sections of said outer arm and extending outwardly from the surface of said outer arm remote from said inner arm.

5. A fastener according to claim 4 wherein said tongues are generally in the form of segments of a frustum of a cone.

6. A fastener according to claim 1 wherein said inner arm has a plurality of longitudinal grooves impressed therein and providing arm stiffening ribs extending lengthwise thereof between the outboard lateral edges thereof and the stud receiving opening therein.

7. A fastener according to claim 1 wherein the said stud receiving opening in said inner arm is elongated to facilitate alignment of a stud end with the said opening in said outer arm during the initial stages of applying said fastener to a stud.

8. A fastener according to claim 1 wherein said inner arm includes a plurality of barblike projections extending outwardly therefrom, said projections being adapted to bitingly engage the surface of a first apertured member to inhibit accidental shifting of an apertured member with respect to a stud carrying member when the said members are clamped together by the fastener.

* * * * *